United States Patent
Sorger et al.

(10) Patent No.: US 10,561,969 B2
(45) Date of Patent: Feb. 18, 2020

(54) FILTER ELEMENT HAVING SUPPORTING ELEMENTS, FILTER HAVING A FILTER ELEMENT, AND FILTER HOUSING OF A FILTER

(71) Applicant: MANN+HUMMEL GMBH, Ludwigsburg (DE)

(72) Inventors: Nadine Sorger, Fellbach (DE); Pascal Neef, Leonberg (DE); Mario Rieger, Ludwigsburg (DE); Werner Blossey, Benningen (DE); Markus Nefzer, Ludwigsburg (DE); Robert Hasenfratz, Waiblingen (DE); Andreas Weber, Freiberg a.N. (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 396 days.

(21) Appl. No.: 14/864,179

(22) Filed: Sep. 24, 2015

(65) Prior Publication Data

US 2016/0023137 A1    Jan. 28, 2016

Related U.S. Application Data

(63) Continuation of application No. PCT/EP2014/054814, filed on Mar. 12, 2014, and a (Continued)

(30) Foreign Application Priority Data

Jul. 12, 2013 (DE) .................. 10 2013 011 612

(51) Int. Cl.
| | | |
|---|---|---|
| *B01D 29/07* | (2006.01) | |
| *F02M 35/02* | (2006.01) | |
| *F02M 35/024* | (2006.01) | |

(52) U.S. Cl.
CPC ......... *B01D 29/07* (2013.01); *F02M 35/0201* (2013.01); *F02M 35/02416* (2013.01)

(58) Field of Classification Search
CPC ..................... B01D 46/0006; B01D 46/10; B01D 46/2411; B01D 46/4236; B01D 46/521;
(Continued)

(56) References Cited

U.S. PATENT DOCUMENTS

| | | | |
|---|---|---|---|
| 4,498,989 A | 2/1985 | Miyakawa et al. | |
| 4,925,469 A * | 5/1990 | Clement ............ | B01D 46/0005 55/480 |

(Continued)

FOREIGN PATENT DOCUMENTS

| | | |
|---|---|---|
| DE | 19748974 C1 | 6/1999 |
| DE | 19859854 A1 | 6/2000 |

(Continued)

*Primary Examiner* — Bobby Ramdhanie
*Assistant Examiner* — Donovan Bui-Huynh
(74) *Attorney, Agent, or Firm* — James Hasselbeck

(57) ABSTRACT

A filter element is provided with a filter bellows that has an inflow side and an outflow side for a fluid to be filtered, wherein the filter bellows is made of a zigzag-folded filter medium with folds with fold edges. The inflow side is defined by the fold edges of the folds of the zigzag-folded filter medium at the inflow side and the outflow side is defined by the fold edges of the folds of the zigzag-folded filter medium at the outflow side. At least one filter element holding device is provided that holds the filter element in a filter housing. The at least one filter element holding device is connected directly or indirectly with the filter bellows. At least one supporting element supports the filter element in the filter housing; the at least one supporting element is separate from the at least one filter element holding device.

14 Claims, 3 Drawing Sheets

Related U.S. Application Data continuation of application No. PCT/EP2013/056233, filed on Mar. 25, 2013.

(58) Field of Classification Search
CPC .. B01D 46/522; B01D 29/07; B01D 2201/02; B01D 2265/024; B01D 2265/06; B01D 2271/02; B01D 2279/60; F02M 35/02416; F02M 35/02491

See application file for complete search history.

(56) References Cited

U.S. PATENT DOCUMENTS

| | | |
|---|---|---|
| 5,391,212 A | 2/1995 | Ernst et al. |
| 8,298,310 B2 | 10/2012 | Weber |
| 8,808,417 B2 | 8/2014 | Engelland et al. |
| 8,852,310 B2 | 10/2014 | Holzmann |
| 2005/0284116 A1* | 12/2005 | Duffy ............... B01D 46/0001 55/497 |
| 2007/0157589 A1 | 7/2007 | Haberkamp et al. |
| 2007/0289265 A1 | 12/2007 | Coulonvaux et al. |
| 2010/0236204 A1* | 9/2010 | Bouhanna ......... B01D 46/0005 55/494 |
| 2014/0311108 A1 | 10/2014 | Reichter et al. |
| 2015/0007536 A1 | 1/2015 | Schmid et al. |
| 2015/0013542 A1 | 1/2015 | Hasenfratz et al. |

FOREIGN PATENT DOCUMENTS

| | | |
|---|---|---|
| DE | 20112440 U1 | 1/2001 |
| DE | 202005015126 U1 | 2/2007 |
| JP | 2000130272 A | 5/2000 |
| WO | 2013139992 A1 | 9/2013 |

* cited by examiner

FILTER ELEMENT HAVING SUPPORTING ELEMENTS, FILTER HAVING A FILTER ELEMENT, AND FILTER HOUSING OF A FILTER

CROSS-REFERENCE TO RELATED APPLICATIONS

This application is a continuation application of international application No. PCT/EP2014/054814 having an international filing date of 12 Mar. 2014 and designating the United States, the international application claiming a priority date of 25 Mar. 2013, based on prior filed international application No. PCT/EP2013/056223, and further claiming a priority date of 12 Jul. 2013, based on prior filed German patent application No. 10 2013 011 612.0, the entire contents of the aforesaid two international applications and the aforesaid German patent application being incorporated herein by reference.

BACKGROUND OF THE INVENTION

The invention concerns a filter element, in particular a flat filter element, for installation in a filter housing of a filter for fluid, in particular of an air filter, in particular of an internal combustion engine, in particular of a motor vehicle, comprising a filter bellows that is in particular open and comprises an inflow side and an outflow side for the fluid to be filtered, wherein the filter bellows preferably comprises a zigzag-folded filter medium that comprises the inflow side which is defined by the fold edges at the inflow side and the outflow side that is defined by the fold edges at the outflow side.

Moreover, the invention concerns a filter for fluid, in particular an air filter, in particular of an internal combustion engine, in particular of a motor vehicle, comprising an openable filter housing that comprises at least one inlet and at least one outlet for the fluid and in which a filter element, in particular the filter element according to the invention, in particular a flat filter element, is installed in such a way that it separates the at least one inlet from the at least one outlet.

Moreover, the invention concerns a filter housing of a filter for fluid, in particular of a filter according to the invention, in particular of an air filter, in particular of an internal combustion engine, in particular of a motor vehicle, that is openable, that comprises at least one inlet and at least one outlet for the fluid and in which a filter element, in particular a filter element according to the invention, in particular a flat filter element, can be installed in such a way that it separates the at least one inlet from the at least one outlet.

WO 2012/175438 A1 discloses a filter device for filtering fresh air of an internal combustion engine of a vehicle. The filter device comprises a filter housing that comprises two housing shells. The two housing shells are fastenable to each other in a flange area and enclose in this way an interior. The filter device comprises moreover a plate filter element that is received in the interior of the housing. The filter element comprises a planar, flat, plate-shaped filter body which comprises a rim that is arranged so as to extend circumferentially and laterally and so as to frame a cross-section of the filter body that can be flowed through. The filter element comprises additionally a seal which is attached to the filter body in such a way that it extends circumferentially about the rim. Within the filter device or within the housing, the seal is located within the flange area.

The invention has the object to provide a filter element, a filter, and a filter housing of the aforementioned kind in such a way that holding and/or positioning of the filter element in the filter housing can be improved. In particular, a support action of the filter element in the filter housing is to be improved.

SUMMARY OF THE INVENTION

This object is solved according to the invention with the filter element in that the filter element comprises at least one filter element holding device for holding the filter element in the filter housing, which is connected directly or indirectly with the filter bellows, and in that the filter element comprises, separate from the at least one filter element holding device, at least one supporting element for supporting the filter element in the filter housing.

According to the invention, in addition to the at least one filter element holding device, there is thus at least one supporting element provided that can support the filter element in the filter housing. The filter element holding device can be connected directly or indirectly to the filter bellows. With the filter element holding device the filter element can be held in a simple way in an appropriate counter holding device of the filter housing. In this way, the filter element can be positioned easily in the filter housing. When, for simplifying the description, an imaginary X-Y-Z coordinate system whose z-axis is axial to the element axis is positioned in the filter element, the filter element with the at least one filter element holding device can be secured advantageously at least in the direction of the z-axis within the filter housing. With the at least one supporting element, the filter element can be supported transversely to the z-axis, in particular in the direction of the x-axis and/or in the direction of the y-axis. In addition or as an alternative, the filter element can be supported with the at least one supporting element in the direction of the z-axis.

Advantageously, the at least one supporting element can be designed such that the filter element is supported in different directions.

The at least one supporting element and the at least one filter element holding device are separate from each other in accordance with the invention. In this context, "separate" means that the at least one supporting element and the at least one filter element holding device are not arranged immediately adjacent to each other, particularly not on a common holder. However, they can be arranged, particularly attached, in particular at a common side, in particular a circumferential side, of the filter element so that, by means of the side of the filter element, they can be connected mechanically to each other. Due to the separation, the at least one supporting element and the at least one filter element holding device each can be optimized with regard to their supporting function, in particular support direction, and/or optionally holding function. Accordingly, an optimal force transmission between the filter element and the filter housing can be realized.

With the invention, even filter elements that are relatively large, in particular voluminous and/or heavy and/or expansive in at least one direction, in particular in the direction of the element axis, in particular the z-axis, can be stably and reliably held and positioned in the filter housing. In particular, even filter elements with folded filter media that have deep folds and/or variable fold heights can thus be reliably secured in the filter housing.

Advantageously, the filter element can be suitable for filtration of air. It can also be provided for filtration of other types of fluids, in particular gases or liquids. Accordingly, a corresponding filter element can be used in particular also for filtration of fuel, oil, water or urea solution.

Advantageously, the filter element can be used in an internal combustion engine of a motor vehicle.

Advantageously, the filter element can be arranged in an air filter of a commercial vehicle, in particular of a truck, a bus, a construction vehicle or agricultural machine. Such filter elements, in comparison to filter elements of passenger cars, can be of a larger size. The filter element can however also be used in passenger cars.

The invention can be used also outside of automotive technology, in particular in industrial motors. Use of the invention outside of internal combustion engines, in particular in automotive technology, is also possible.

In case of an open filter bellows, the filter medium is not closed to a hollow body. In contrast thereto, in a hollow filter element, in particular in a so-called round filter element, the filter medium is circumferentially closed and surrounds an element interior.

Advantageously, the filter element can be a flat filter element. The filter element can be planar or curved. In this context, the inflow side and/or the outflow side of the filter bellows can be planar or curved. The filter element can also be box-shaped.

The filter bellows can have approximately the shape of a polyhedron. Advantageously, the filter bellows can be cubic, parallelepipedal, pyramid-shaped prism-shaped, wedge-shaped or the like. In this context, it is not required that all sides of the filter bellows are planar. The sides of the filter bellows can also be partially curved. Opposite sides can be extending in parallel. Alternatively or in addition, they can also be extending slantedly relative to each other or non-parallel in another way.

Advantageously, the element axis of the filter element can be parallel or axial relative to the installation direction of the filter element into the filter housing. Advantageously, a housing axis of the filter housing can be parallel or axial to the element axis and/or the installation direction of the filter element. The removal direction is in general opposite to the installation direction. The element axis of the filter element can be advantageously a center axis and/or symmetry axis. Advantageously, the element axis can cross the inflow side and the outflow side of the filter element. In case of a planar inflow side and/or planar outflow side, the element axis and/or the installation direction can advantageously extend perpendicular thereto. The main flow direction of the fluid to be filtered through the filter bellows can extend advantageously parallel or axial to the element axis and/or to the installation direction.

The filter medium can be folded in a zigzag shape to form the filter bellows. By folding the filter medium, the ratio between the active filter surface area and the constructive volume of the filter bellows can be improved. In filter elements, in particular flat filter elements with an open filter bellows, the filter media are not closed, meaning that end face folds as well as end face edges are not connected to each other. In contrast thereto, in hollow filter elements, in particular round filter elements, the filter media are formed to a closed filter bellows, i.e., their end face folds are connected to each other. The end face folds are the two outer folds, on opposite end faces, in particular longitudinal sides of the filter bellows. End face rims are the two free rims of the filter medium which extend along the end face folds and delimit them at the end faces of the filter bellows. The end face edges of the filter bellows are the two other free rims of the filter bellows which extend between the end face rims and extend in accordance with the folding of the filter bellows. The fold edges are the edges along which the filter medium is folded. In case of a zigzag-folded parallelepipedal filter bellows the end face rims and the fold edges are straight and extend parallel to each other. The end face edges extend in a zigzag shape and perpendicular to the end face rims and the fold edges. The end face edges each define an end face edge side of the filter bellows. In the folded filter medium, the inflow side of the filter bellows is defined by the fold edges at the inflow side. The outflow side is defined by the fold edges at the outflow side of the filter bellows.

The filter medium can be a filter paper, filter nonwoven, meltblown material, a fabric or another type of filter medium that is suitable for filtration of fluids, in particular air.

Advantageously, the at least one supporting element can be spaced, in particular axially, from the at least one filter element holding device relative to the element axis.

In this way, the risk that the filter element can tilt in the filter housing as it is guided, in its position, and/or in operation of the filter can be reduced.

Advantageously, the at least one filter element holding device can project radially outwardly past the at least one supporting element with regard to the element axis, in particular the installation direction. In this way, the filter element in the installation direction can be inserted, with the at least one supporting element leading, into the filter housing without the at least one supporting element catching on the counter holding device of the filter housing.

In an advantageous embodiment, a position of at least one part of the at least one supporting element that is supported on the filter housing can be changeable, in particular elastically, relative to the filter bellows.

Advantageously, the at least one supporting element can be designed such that it enables a position-tolerant installation of the filter element in the filter housing. Advantageously, the at least one supporting element can be embodied to be flexible, in particular elastic. In this way, an optimal, in particular position-tolerant, supporting action of the filter element in the filter housing can be enabled. The at least one supporting element can advantageously be comprised of a flexible, in particular elastic, material or may comprise such material.

Advantageously, the at least one supporting element can be designed such that it can realize damping, in particular vibration damping, between the filter element and the filter housing. In this way, the filter element can be protected from, in particular operation-caused, vibrations. In this way, damage of the filter element by vibrations can be reduced. The service life of the filter element can be increased. Alternatively or in addition, damping can have a positive effect on noise development of the filter in operation. Damping can advantageously be achieved by a flexible, in particular elastic, supporting element.

In a further advantageous embodiment, the at least one supporting element can be comprised of a plastic material that is in particular elastic or can comprise a plastic material that is in particular elastic.

By means of plastic material, a supporting force can be transmitted easily. The at least one supporting element can be realized easily from plastic material, in particular by injection-molding or casting. An elastic, in particular springy, action and/or design can be easily realized with plastic material. Plastic material can be connected in a simple way with the filter bellows.

The at least one supporting element can be made advantageously of foam, foamed plastic or another type of foamed material, rubber, a thixotropic material, in particular polyurethane (PUR), adhesive, cellular rubber, and/or an elastomer or may comprise one of the listed materials or another type of material.

The at least one supporting element can advantageously be a strip, a bead, and/or a cushion (pad) or may comprise such a means.

Advantageously, the at least one supporting element can be connected with the filter bellows indirectly or directly by material fusion and/or form-fit and/or friction connection. In particular, it can be glued on, welded, injection-molded, integrally formed, cast on, or metered as a bead. Alternatively or in addition, the at least one supporting element can also be connected in any other way, in particular by means of a plug connection, a locking connection, a tie connection, and/or a clamping connection, indirectly or directly, with the filter bellows.

In a further advantageous embodiment, the at least one supporting element can be arranged at the inflow side, the outflow side, or an end face fold of the filter bellows. In this way, the filter element can be supported transversely to the end face edges of the filter bellows.

Advantageously, the at least one supporting element and the at least one filter element holding device can be arranged in the vicinity of sides that are in particular axially opposite each other relative to the element axis, in particular the installation direction, in particular end faces of the filter element. In this way, a force transmission between the filter housing and the filter element can be improved. Tilting or canting of the filter element in the filter housing can thus be prevented better.

In this context, "in the vicinity" means that a spacing between the at least one supporting element and the at least one filter element holding device is significantly greater than the respective spacings between the at least one supporting element or the at least one filter element holding device and the corresponding sides, in particular the inflow side or the outflow side, of the filter element. In this context, the at least one supporting element and/or the at least one filter element holding device can also be arranged directly adjacent to the corresponding sides of the filter element.

Advantageously, the at least one supporting element can be located in the vicinity of a front side of the filter element relative to an installation direction of the filter element into the filter housing. The front side of the filter element can advantageously be facing the housing bottom of the filter housing. In this way, the filter element can be supported in a simple way in the area of the housing bottom. Advantageously, the front side of the filter element can be the outflow side.

Advantageously, the at least one filter element holding device can be located in the vicinity of a rear side of the filter element. Advantageously, the rear side of the filter element can be the inflow side.

Advantageously, several supporting elements can be provided on the filter bellows. In this way, the filter element can be supported more uniformly in the filter housing. The risk of canting of the filter element can thus be reduced. In this way, even relatively heavy and/or large filter elements can be placed and held easily and precisely in the filter housing.

Advantageously, the supporting elements can be arranged on different sides of the filter bellows. In this way, the filter element can be supported in different directions.

In addition or alternatively, several supporting elements can also be located on one side of the filter bellows. In this way, the filter bellows can be supported across a larger surface area. In this way, the supporting action can be realized more uniformly.

Advantageously, at least two supporting elements can be arranged, relative to a plane through the element axis, in particular the installation direction, on sides that are opposite each other, in particular circumferential sides, of the filter element.

In a further advantageous embodiment, the at least one supporting element can be arranged, in particular approximately centrally, between opposite end face edge sides of the filter bellows. The supporting action can be improved in this way.

Advantageously, the at least one supporting element can be optionally arranged between the end members of the filter element. In this way, the holding action and/or the supporting action, which is achieved by the end members in the filter housing, can be improved by means of the at least one supporting element.

Centrally between the oppositely positioned end face edge sides, the at least one supporting element can achieve an optimal supporting action.

In a further advantageous embodiment, the at least one supporting element can be connected by an intermediate layer with the filter bellows.

In this way, the at least one supporting element can be mounted together with the filter element, in particular the filter bellows.

By means of the intermediate layer, a force transmission between the at least one supporting element and the filler filter bellows can be optimized in a simple way. Accordingly, a force can be transmitted from the at least one supporting element onto the filter bellows through a surface area that is enlarged by the intermediate layer.

The intermediate layer can advantageously be a type of nonwoven or paper.

In a further advantageous embodiment, a maximum fold height of the folds of the filter bellows can be greater than an expansion of the inflow side and/or of the outflow side in at least one direction transverse to an element axis of the filter element.

In particular in case of parallelepipedal filter bellows one can then speak of "deep folds".

Due to the relatively large fold heights, an appropriately enlarged filter surface area can be achieved in a simple way.

In this context, the maximum fold height can be greater than an expansion of the filter bellows in the direction of the fold edges. In addition or alternatively, the maximum fold height can be greater than an expansion of the filter bellows transverse to the fold edges.

In a further advantageous embodiment, fold heights and/or fold extensions of the folds can vary within the filter bellows.

The fold heights and/or fold extensions can vary in this context within at least one of the folds. The fold heights and/or fold extensions can alternatively or additionally vary also between folds, in particular neighboring folds. In this way, a curved course of the inflow side and/or of the outflow side can be realized.

Advantageously, the fold heights at the center of the filter bellows can be smaller or greater than in areas of the longitudinal sides. In this way, the appropriate side of the filter bellows, in particular inflow side or outflow side, can have a course of an envelope of approximately an ellipsoid or cylinder or a circular cylinder.

Alternatively, the filter bellows can also be stepped by appropriate variation of the fold heights. In this way, the filter bellows in the area of the end face folds can be of different height.

In a further advantageous embodiment, on at least one circumferential side of the filter bellows which extends between the inflow side and outflow side, at least one end member, in particular an end disk, can be arranged. The filter bellows and the entire filter element can be stabilized by means of the at least one end member. Moreover, the filter bellows with the at least one end member can be in particular seal-tightly closed off at the corresponding side. Also, the at least one end member can serve as a connecting element or holding element with which the filter element can be stably positioned and held in the filter housing.

Advantageously, on several circumferential sides of the filter bellows appropriate end members can be arranged. In this way, the stability of the filter element can be further improved.

Advantageously, on opposed circumferential sides of the filter bellows an end member can be arranged, respectively. The end member can advantageously be located relative to the installation direction of the filter element and/or of the element axis on opposed sides of the filter bellows.

In case of a folded filter medium, the at least one end member can be located at an end face edge side of the filter bellows. The at least one end member can be connected seal-tightly with the end face edge side of the filter bellows. In this way, the at least one end member can seal-tightly close off the end face edge side of the filter bellows.

Advantageously, both end face edge sides of the filter bellows can be closed off with an end member, respectively.

The at least one end member can be advantageously an end disk. An end disk is flat in one expansion direction in comparison to the other expansion directions. In this way, the required installation space of the end member and thus also of the filter element as a whole can be reduced.

The at least one end member can be provided with a rib structure with which its stability can be improved.

The at least one end member can advantageously be comprised of plastic material or can comprise plastic material. Plastic material can be elastic. The at least one end member of plastic material may exhibit in particular a mechanical damping action. Moreover, plastic material can be easily shaped, in particular cast or injection-molded.

The at least one end member, in particular the end member of plastic material, can be advantageously connected, indirectly or directly, to the filter bellows by material fusion and/or form fit and/or friction connection, in particular by means of welding, adhesion, injection molding, integrally forming, casting, by means of a plug connection, locking connection, pressing connection and/or clamping connection or in other ways.

In a further advantageous embodiment, the at least one filter element holding device can extend between the inflow side and the outflow side along at least one part of a circumference of the filter bellows and can comprise at least one holding arrangement that extends away from the filter bellows transversely, in particular radially, relative to an element axis, in particular the installation direction.

In this way, with the at least one filter element holding device at least an axial positioning and holding of the filter element in the filter housing can be realized relative to the installation direction and/or the element axis.

Advantageously, the filter element holding device can be connected with the possibly present at least one end member. In this way, force transmission from the filter housing onto the filter bellows and vice versa can be improved.

Advantageously, the filter element can have a seal that is of a circumferentially closed configuration relative to the element axis. The seal can optionally be positioned at or on at least one of the holding arrangements. Advantageously, the seal can be positioned and/or held at or on the optional filter element holding device. The seal can advantageously at least partially form the filter element holding device. Advantageously, the seal can surround the at least one filter element holding device externally in radial direction relative to the element axis, in particular relative to the installation direction. The course of the shape of the seal can advantageously be matched to or correspond to the course of the shape of the at least one filter element holding device.

Moreover, the object is solved according to the invention with the filter in that the filter element comprises at least one filter element holding device for holding the filter element in the filter housing which is connected directly or indirectly with the filter bellows, in that the filter housing comprises a counter holding device for the filter element holding device, and in that the filter element comprises, separate from the at least one filter element holding device, at least one supporting element for supporting the filter element in the filter housing.

The advantages and features that have been indicated above in connection with the filter element according to the invention and its advantageous embodiments apply likewise to the filter according to the invention, and vice versa.

Also, the object is solved according to the invention with the filter housing in that the filter housing comprises at least one counter holding device for at least one filter element holding device of the filter element for holding the filter element in the filter housing and in that the filter housing comprises, separate from the at least one counter holding device, at least one supporting surface for at least one supporting element of the filter element for supporting the filter element in the filter housing.

The advantages and features that have been indicated above in connection with the filter element according to the invention and the filter according to the invention and their respective advantageous embodiments apply likewise to the filter housing according to the invention, and vice versa.

BRIEF DESCRIPTION OF THE DRAWINGS

Further advantages, features, and details of the invention result from the following description in which embodiments of the invention will be explained in more detail with the aid of the drawing. A person of skill in the art will consider the features disclosed in the drawing, the description, and the claims in combination also expediently individually and combine them to other meaningful combinations.

In the Figures same components are provided with same reference characters.

DESCRIPTION OF PREFERRED EMBODIMENTS

Figure 1:
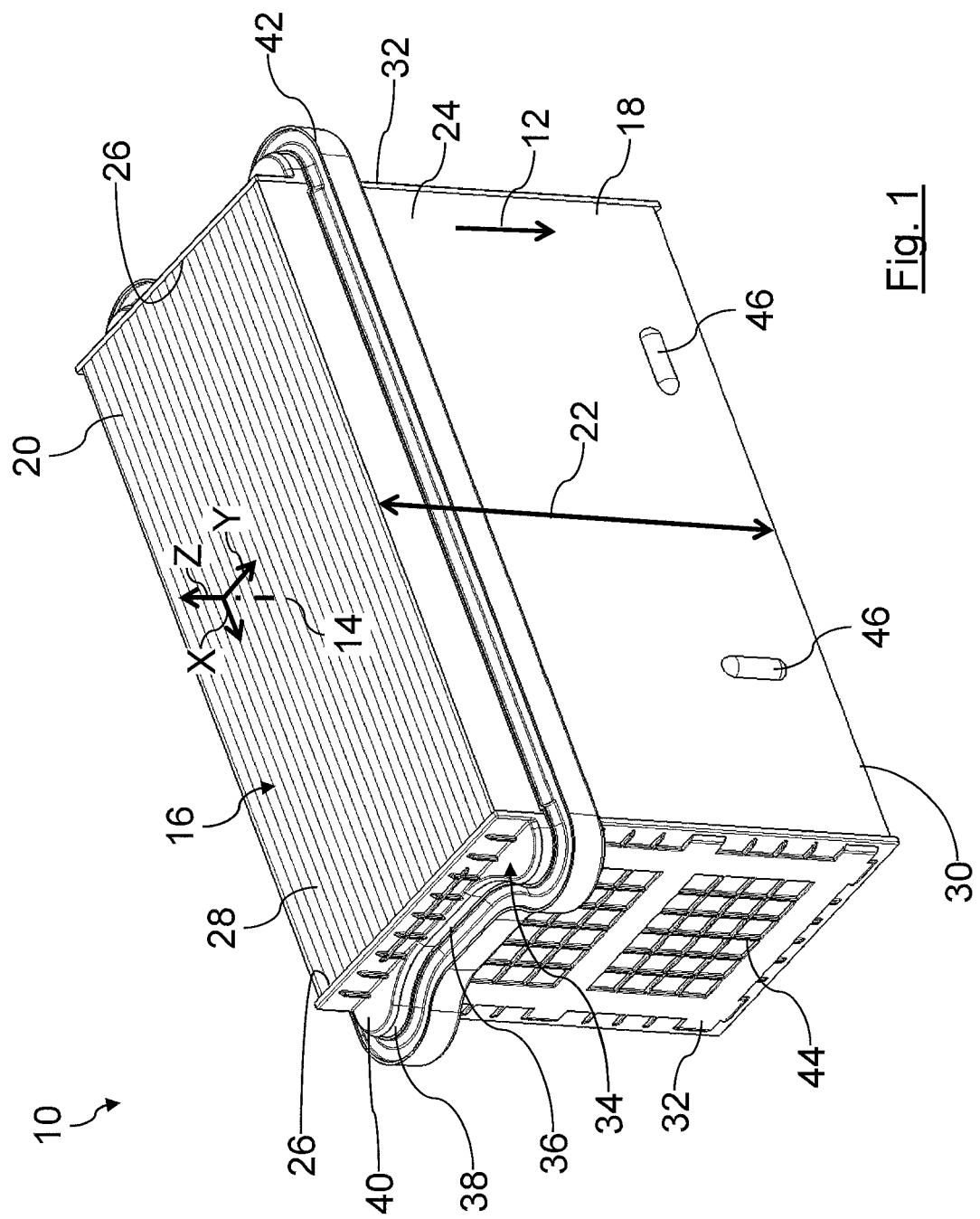
FIG. 1 shows schematically an isometric illustration of an air filter element according to a first embodiment, comprising elastic supporting strips that are metered as a bead onto end face folds of a filter bellows.

In FIG. 1, a filter element 10 of an air filter of an internal combustion engine of a motor vehicle is shown according to a first embodiment. The filter element 10 is arranged exchangeably in an openable filter housing, not shown in FIG. 1, in such a way that it separates an air inlet of the filter housing from an air outlet. The filter housing is assembled of a housing cup and a housing cover. The air filter serves for filtration of combustion air, which is supplied for operating the internal combustion engine.

An installation direction 12 of the filter element 10 into the housing cup extends in the illustrated embodiment parallel to an element axis 14. A housing axis of the filter housing, which is not shown to simplify the illustration, extends coaxially to the element axis 14. The element axis 14 extends, for example, parallel to a z-axis of an X-Y-Z coordinate system that is illustrated in FIG. 1 for simplifying the description.

The filter element 10 can be inserted through an insertion opening, not illustrated, into the housing cup.

The filter element 10 is designed as a flat filter element. The filter element 10 comprises a filter bellows 16 which at the exterior is approximately parallelepipedal and comprised of a zigzag-folded filter medium 18. The filter medium 18 can be filter paper, filter nonwoven or another foldable filter medium suitable for filtration of air. The filter medium 18 is folded along fold edges 20. The fold edges 20 extend parallel to each other and perpendicular to the element axis 14. The fold edges 20 extend, as an example, parallel to an x-axis of the X-Y-Z coordinate system.

Fold heights 22 of the folded filter medium 18 extend parallel to the element axis 14, i.e., in the direction of the z-axis. An axial height of the filter bellows 16 relative to the element axis 14 in the direction of the z-axis is greater than the width of the filter bellows 16 in the direction of the y-axis. The folds can therefore be referred to as deep.

End face edge sides 26 of the filter bellows 16 are defined by the end face edges of the filter medium 18 which are hidden in FIG. 1. The end face edges of the filter medium 18 have an approximately zigzag-shaped course. The end face edge sides 26 are located relative to the element axis 14 on radially opposite sides. The end face edge sides 26 extend parallel to each other and perpendicular to an inflow sides 28 and to an outflow side 30 of the filter bellows 16. The inflow side 28 and the outflow side 30 are defined each by the fold edges 20 which are provided at the inflow side and the outflow side, respectively. The end face edge sides 26 connect two oppositely positioned longitudinal sides 24 of the filter bellows 16 which are parallel to an X-Z plane and form therewith the circumference of the filter bellows 16. The longitudinal sides 24 are formed by the end face folds of the filter bellows 16.

The inflow side 28, which in FIG. 1 is at the top, is located, when filter element 10 is installed, on the side which is facing the housing cover. It is connected with the air inlet of the filter housing.

The outflow side 30, in FIG. 1 at the bottom, is located on the side which is facing the cup bottom of the housing cup. It is connected to the air outlet of the filter housing.

In operation of the filter element 10, the filter bellows 16 according to the present embodiment is flowed through by air from the inflow side 28 to the outflow side 30. A main flow direction of the air through the filter bellows 16 extends thus in the present example substantially parallel to the installation direction 12 and to the element axis 14. The filter bellows 16 can also be flowed through in reverse direction. In this case, the designations "inflow side" and "outflow side" will change.

At the end face edge sides 26 of the filter bellows 16, an end disk 32 is seal-tightly connected with the end face edges of the filter medium 18 located there at, respectively. The end disks 32 each are comprised of plastic material. The end disks 32 are approximately rectangular at the exterior.

In the vicinity of their rim at the inflow side, each end disk 32 has a filter element holding device 34. The filter element holding device 34 comprises a monolithic projection 36. The projection 36 extends circumferentially relative to the element axis 14. It extends in the direction of the fold edges 20, viewed from the filter bellows 16, outwardly and approximately parallel to the rim of the end disk 32 at the inflow side.

In the area of their ends which are each facing the longitudinal sides 24, the projections 36 each have, viewed from the filter bellows 16, an outwardly projecting holding arrangement 38. The holding arrangements 38 each have at their side which is facing the inflow side 28 and their side which is facing the outflow side 30 a holding surface 40. The holding surfaces 40 each extend approximately parallel to the X-Y plane.

By means of the filter element holding device 34, the filter element 10 can be held axially in the filter housing relative to the installation direction 12 and the element axis 14. The filter housing comprises for this purpose appropriate counter surfaces for the filter element holding device 34. The counter surfaces are part of a counter holding device of the filter housing.

A seal 42 which is designed as a profiled seal surrounds the filter bellows 16 and the end disks 32, respectively, the projections 36 and the holding arrangements 38, in circumferentially closed arrangement relative to the element axis 14. It is located somewhat downstream of the fold edges 20 at the inflow side, when viewed from the inflow side 28.

Moreover, the end disks 32 are provided at their outer sides facing away from the filter bellows 16 with reinforcement ribs 44 which extend in a lattice arrangement.

On the longitudinal sides 24, i.e., the end face folds, of the filter bellows 16, two supporting strips 46 are arranged, respectively.

The supporting strips 46 are arranged separate from the filter element holding device 34 in the vicinity of the outflow side 30. The support strips 46 are located, viewed in the direction of the element axis 14, approximately at the same height. They are each arranged between the oppositely positioned end face edge sides 26 of the filter bellows. The support strips 46 on a longitudinal side 24 are spaced apart from each other in the direction of the x-axis. A spacing between the respective centers of the support strips 46 is approximately twice as large as the spacings between the centers of the support strips 46 and the respective neighboring end face edge side 26.

The support strips 46 each have approximately the shape of half a circular cylinder whose bases are rounded. The imaginary axes of the circular cylinder are located on the side which is facing the filter bellows 16. On each longitudinal side 24, one of the supporting strips 46 is oriented with its imaginary axis parallel to the element axis 14, i.e., parallel to the z-axis. The other supporting strip 46 is oriented with its imaginary axis perpendicular thereto, parallel to the fold edges 20, i.e., parallel to the x-axis.

The filter element holding device 34 and the seal 42 project past the supporting strips 46 relative to the element axis 14 and to the installation direction 12 in radial outward direction.

The supporting strips 46 each are made of elastic thixotropic polyurethane (PUR). The polyurethane for realizing the supporting strips 46 is metered as beads onto the end face folds at the longitudinal sides 24 of the filter bellows 16.

With the filter element 10 installed, the supporting strips 46 support elastically the filter element 10 in the filter housing transversely to the element axis 14. The filter housing comprises for this purpose appropriate supporting surfaces, not illustrated in FIG. 1, on which, relative to the element axis 14, radial outer circumferential sides of the supporting strips 46 can rest. In this context, as a result of the elasticity of the polyurethane the positions of the radial outer circumferential sides of the supporting strips 46 are elastically changeable relative to the filter bellows 16. Accordingly, a possible positional tolerance of the filter element 10 in the filter housing can be compensated. Also, in this way possible vibrations or oscillations upon operation of the filter can be dampened.

Figures 2, 3:
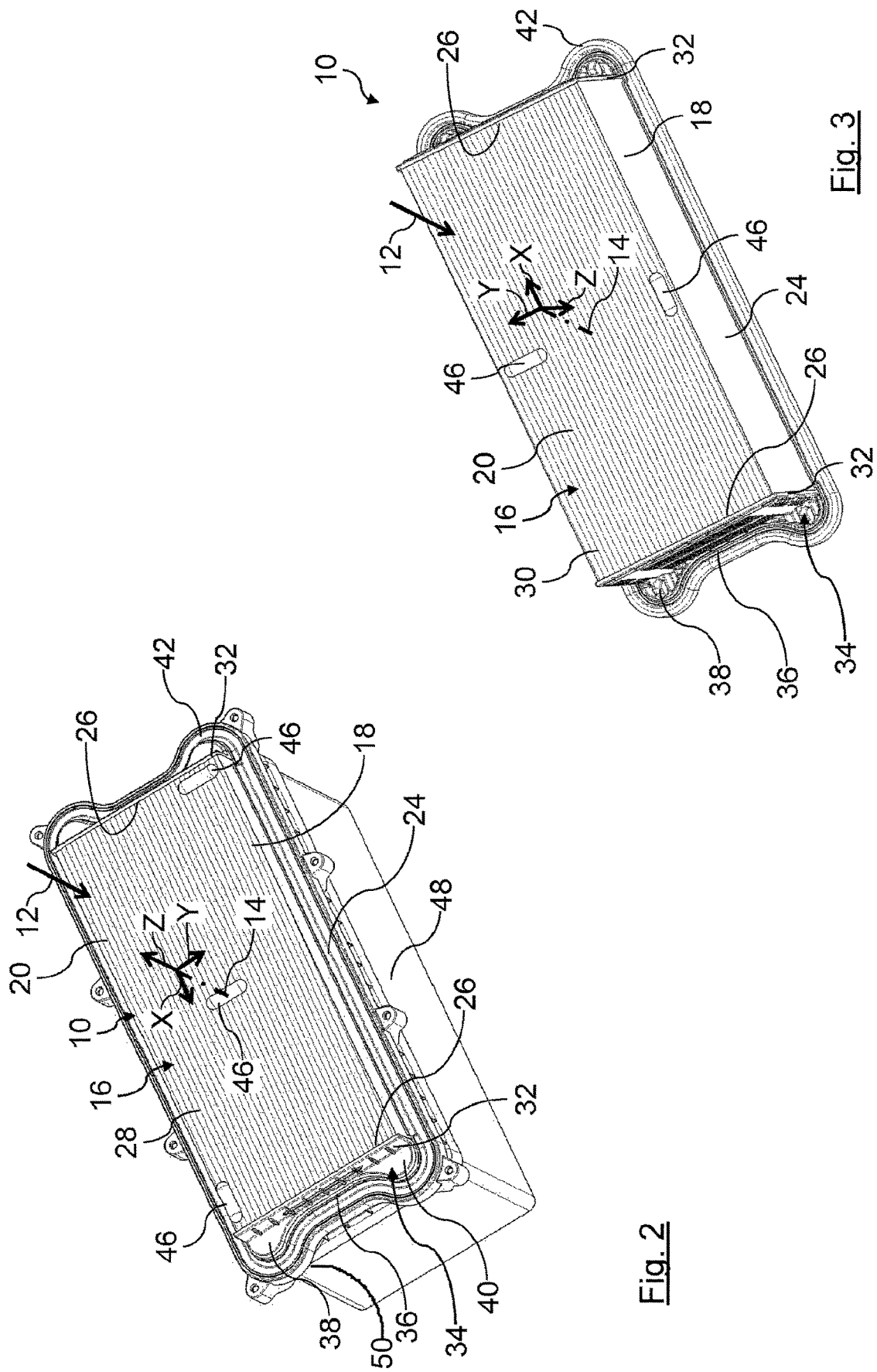
FIG. 2 shows schematically an isometric illustration of an air filter with an open air filter housing in which an air filter element according to a second embodiment is provided, comprising elastic supporting strips which are metered as a bead onto an inflow side of the filter bellows.
FIG. 3 shows schematically an isometric illustration of an air filter element according to a third embodiment, comprising elastic supporting strips which are metered as a bead onto the outflow side of the filter bellows.

In FIG. 2, a filter element 10 according to a second embodiment is shown disposed in a receptacle of an open filter cup of the filter housing 48.

In the second embodiment, three supporting strips 46 are arranged on the inflow side 28 of the filter element 10. Two of the supporting strips 46 are located in this context at opposed corners of the inflow side 28 relative to the element axis 14. One of these two supporting strips 46 is oriented parallel to the fold edges 20. The other supporting strip 46 is oriented perpendicular to the fold edges 20. Approximately at the center of the inflow side 28, the third supporting strip 46 is arranged. The latter is also oriented perpendicular to the folds 20. With the three supporting elements 46, the filter element 10 is elastically supported relative to a housing cover, not illustrated, of the filter housing 48.

The filter cup of the filter housing 48 comprises a circumferentially extending flange relative to the element axis 14 and the housing axis which is serving as a counter holding device 50. On the counter holding device 50 the filter element holding device 34 is resting for holding the filter element 10 in the filter housing 48 in axial direction.

In FIG. 3, a filter element 10 according to a third embodiment is shown viewed in a direction onto the outflow side 30.

In the third embodiment, two supporting strips 46 are arranged on the outflow side 30 of the filter element 10. The supporting strips 46 each are located, viewed in the direction of the fold edges 20, approximately centrally between the end face edge sides 26. Viewed perpendicular to the fold edges 20, the supporting strips 46 are positioned opposite each other respectively adjacent to the longitudinal sides 24, i.e., the end face folds. One of the supporting strips 46 is oriented parallel to the fold edges 20. The other supporting strip 46 is oriented perpendicular to the fold edges 20. With the two supporting elements 46 the filter element 10 is elastically supported relative to the housing bottom of the filter housing, not illustrated here.

Figure 4:
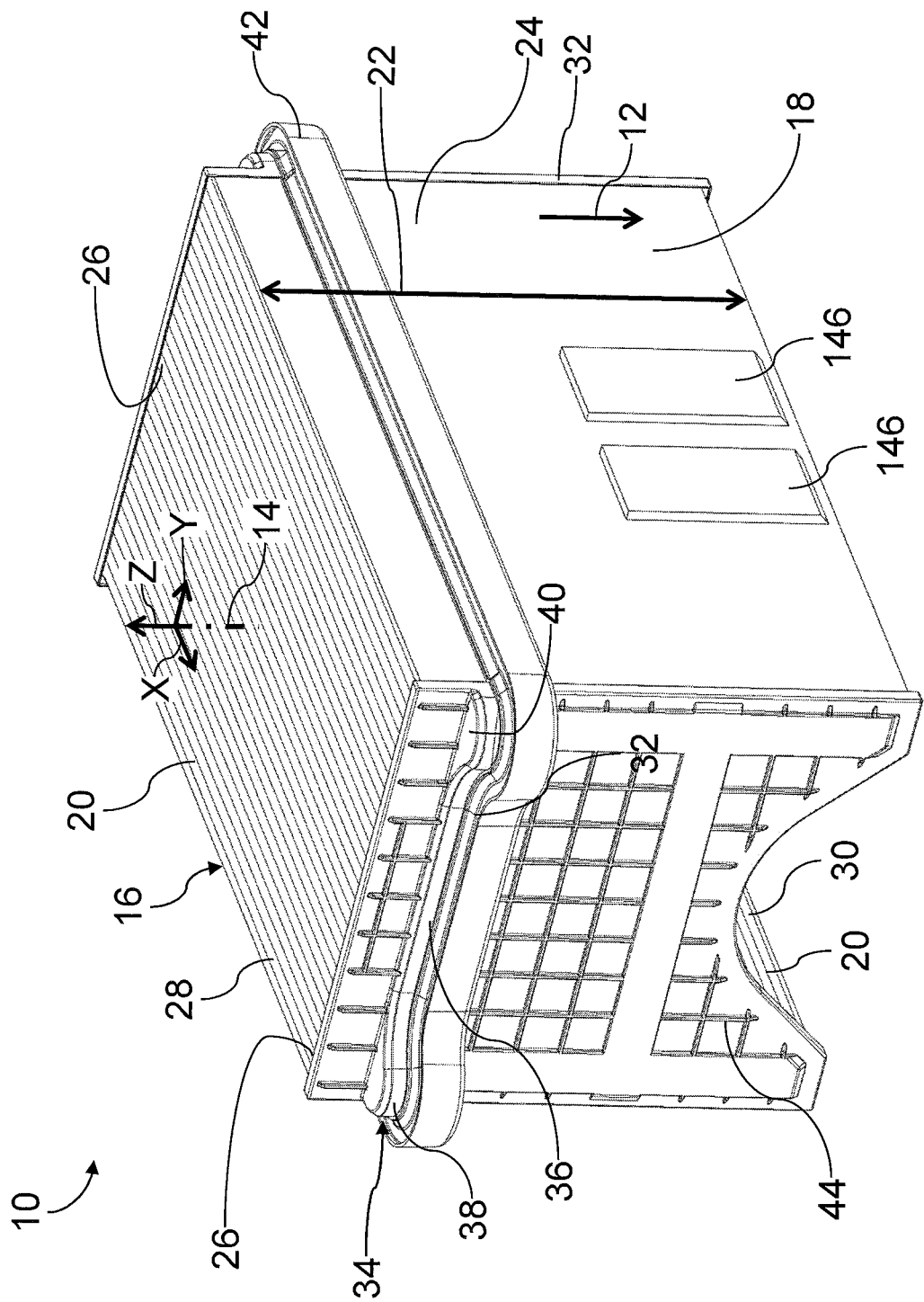
FIG. 4 shows schematically an isometric illustration of a detail of an air filter with an air filter element according to a fourth embodiment, comprising elastic support pads which are glued onto the end face folds of the filter bellows.

In FIG. 4, a filter element 10 according to a fourth embodiment is illustrated. In contrast to the first three embodiments, instead of the supporting strips 46 for supporting the filter element 10 relative to the filter housing, corresponding supporting pads 146 are provided in the fourth embodiment. On each one of the end face folds on the longitudinal sides 24, two identical supporting pads 146 are attached. The supporting pads 146 are made of elastic cellular rubber. They are glued onto the end face folds. The supporting pads 146 each have the shape of approximately parallelepipedal plates. In longitudinal direction, the supporting pads 146 extend parallel to the element axis 14, i.e., to the z-axis. In transverse direction, the supporting pads 146 extend parallel to the fold edges 20, i.e., to the x-axis. The supporting pads 146 each are located adjacent to the rim of the longitudinal sides 24 at the outflow side. They are symmetrically arranged on either side of the Y-Z plane. The supporting pads 146 each are located immediately adjacent to the Y-Z plane, i.e., as a whole approximately centrally between the end face edge sides 26.

The fold heights 22 of the folds varies from fold to fold in the direction of the y-axis. The fold heights 22 of the folds at the center of the filter bellows 16 are smaller than the fold heights 22 of the end face folds at the longitudinal sides 24 of the filter bellows 16. The course of a curve through the fold edges 20 at the outflow side, in FIG. 4 at the bottom, viewed in the longitudinal direction of the filter bellows 16, corresponds approximately to the course of a parabola.

The end disks 32 are approximately rectangular externally. Their lower rims at the outflow side that are facing the outflow side 30 extend accordingly approximately in the shape of a parabola.

While specific embodiments of the invention have been shown and described in detail to illustrate the inventive principles, it will be understood that the invention may be embodied otherwise without departing from such principles.

What is claimed is:

1. A filter element comprising:
    a filter bellows comprising an inflow side and an outflow side for a fluid to be filtered,
    wherein the filter bellows comprises:
        a zigzag-folded filter medium comprising folds, the folds forming fold edges;
        an inflow face of the filter bellows defined by fold edges arranged on the inflow side of the filter bellows;
        an outflow face of the filter bellows defined by fold edges arranged on the outflow side of the filter bellows;
        wherein the fold edges extend from a first end face edge side to an opposite second end face edge side of the zigzag-folded filter medium; and
        wherein the zigzag-folded filter medium has two end face folds, the end face folds are two outermost folds, on opposite longitudinal sides of the filter bellows, each end face fold forming one of two longitudinal sides of the filter bellows, wherein the longitudinal sides extend from and connect the first end face edge side to the second end face edge side and extend from the inflow face to the outflow face of the filter bellows;
    at least one end disk fixedly secured onto and fully covering a respective one of the end face edge sides of the folds of the zigzag-folded filter medium;
    at least one filter element holding device formed as a monolithic projection circumferentially surrounding and closing about filter bellows and projecting outwardly from the filter bellows, the at least one filter element holding device connected to the zigzag-folded filter medium of the filter bellows and configured to hold the filter element in a filter housing, the at least one filter element holding device arranged on at least one of the end face edge sides and projecting outwardly away from the filter bellows, forming a holding surface;

wherein the at least one filter element holding device is arranged between the inflow face and the outflow face and spaced away from both the inflow face and the outflow face;

wherein the at least one filter element holding device is arranged on and connected directly or indirectly with the longitudinal sides of the zigzag-folded filter medium of the filter bellows;

wherein the at least one filter element holding device is arranged on and connected directly onto an outer surface of the at least one end disk;

at least one supporting element arranged directly on the zigzag-folded filter medium and configured to support the filter element in the filter housing, wherein the at least one supporting element is separate from the at least one filter element holding device;

wherein the at least one supporting element is a supporting strip or a supporting pad, arranged entirely on the end face fold on the lateral side of the zigzag-folded filter medium and projecting outwardly from of the filter bellows.

2. The filter element according to claim 1, wherein the at least one supporting element comprises at least one part configured to be supported on the filter housing, wherein a position of the at least one part relative to the filter bellows is changeable.

3. The filter element according to claim 2, wherein the position is elastically changeable.

4. The filter element according to claim 1, wherein the at least one supporting element is made of or comprises a plastic material.

5. The filter element according to claim 4, wherein the plastic material is elastic.

6. The filter element according to claim 1, wherein the at least one supporting element is arranged between opposite end face edge sides of the filter bellows.

7. The filter element according to claim 6, wherein the at least one supporting element is arranged approximately centrally between opposite end face edge sides of the filter bellows.

8. The filter element according to claim 1, further comprising
an element axis that extends through the inflow side and the outflow side,
wherein a maximum fold height of the folds of the zigzag-folded filter bellows is greater than an expansion of the inflow side; of the outflow side; or of the inflow side and the outflow side in at least one direction transverse to the element axis.

9. The filter element according to claim 1, wherein the folds comprise fold heights,
wherein the fold heights vary within the filter bellows.

10. The filter element according to claim 1, wherein the filter bellows comprises a circumference and
wherein the at least one filter element holding device extends along at least one part of the circumference of the filter bellows and is located between the inflow side and the outflow side,
wherein the at least one filter element holding device comprises at least one holding arrangement that extends transversely away from the filter bellows relative to an element axis of the filter element,
wherein the element axis extends through the inflow side and the outflow side.

11. The filter element according to claim 10, wherein the at least one holding arrangement extends radially away from the filter bellows relative to the element axis and
wherein the element axis coincides with an installation direction of the filter element into the filter housing.

12. The filter element according to claim 1, wherein the filter bellows is an open filter bellows.

13. A filter for fluid comprising:
an openable filter housing comprising at least one inlet and at least one outlet for the fluid;
a filter element according to claim 1 installed in the filter housing such that the filter element separates the at least one inlet from the at least one outlet;
wherein the filter housing comprises a counter holding device which the filter element holding device rests against to support the filter element in the filter housing;
wherein the filter housing further comprises at least one supporting surface for the at least one supporting element of the filter element for supporting the filter element in the filter housing, wherein the at least one supporting surface is separate from the at least one counter holding device.

14. The filter element according to claim 1, wherein the at least one supporting element has at least one supporting strip extending across and arranged directly on a plurality of fold edges on the inflow face or the outflow face of the filter bellows.

* * * * *